March 3, 1964   H. BLIESKE   3,122,978
PHOTOGRAPHIC CAMERA WITH AUTOMATIC EXPOSURE SETTING MECHANISM
Filed Jan. 23, 1959   2 Sheets-Sheet 1
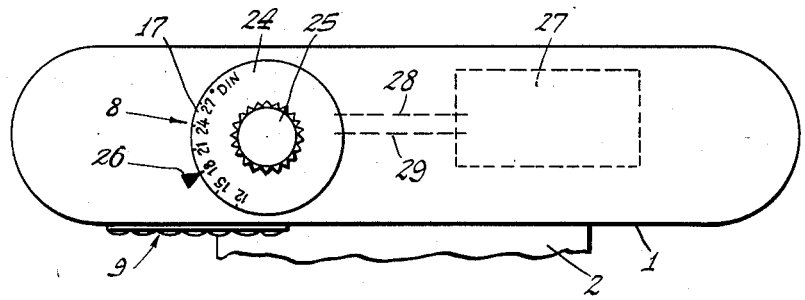
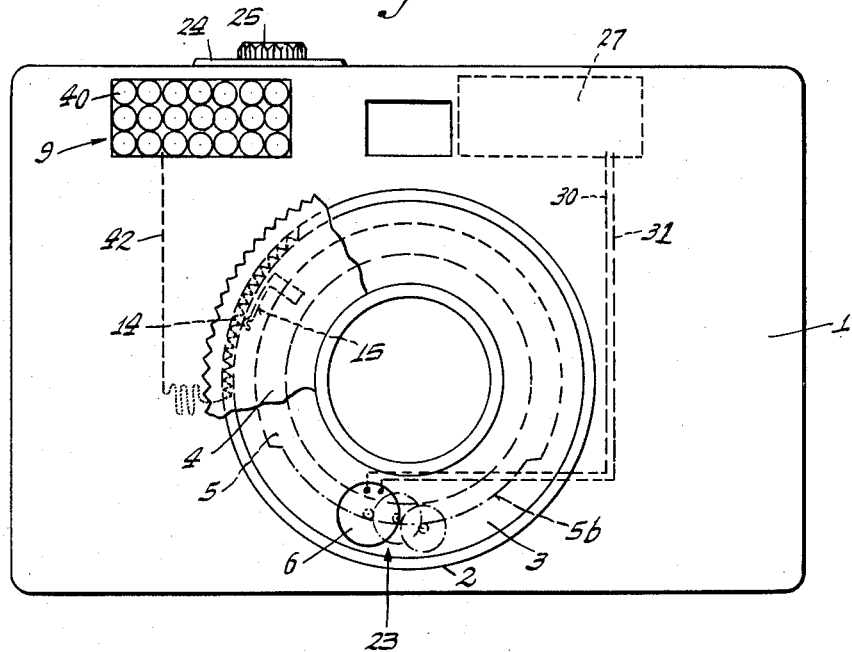
INVENTOR.
Herbert Blieske
BY
Munn, Liddy, Daniels & March
ATTORNEYS

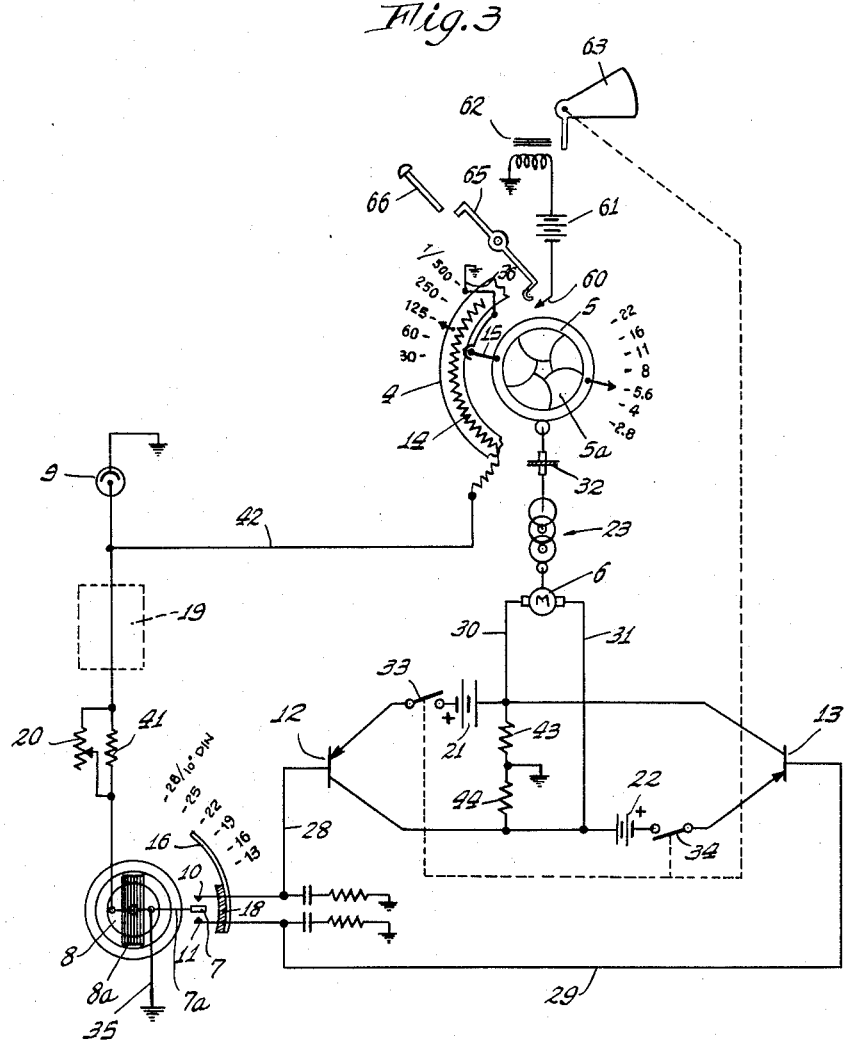

United States Patent Office 3,122,978
Patented Mar. 3, 1964

3,122,978
PHOTOGRAPHIC CAMERA WITH AUTOMATIC
EXPOSURE SETTING MECHANISM
Herbert Blieske, Frankfurt am Main, Germany, assignor
to Alfred Gauthier, G.m.b.H., Calmbach (Enz), Germany, a corporation of Germany
Filed Jan. 23, 1959, Ser. No. 788,594
Claims priority, application Germany Jan. 25, 1958
17 Claims. (Cl. 95—10)

This invention relates to photographic cameras having automatic speed setting devices of the type wherein a direct current electric motor reversibly drives the exposure setting member of the camera, said motor being energized by a power source which is controlled by a circuit having a movable contact actuated by a moving coil relay, which latter is in turn made responsive to the current of a photoelectric element.

Various types of photographic cameras of the above kind, wherein an exposure setting member is automatically adjusted in accordance with existing light conditions, are already well known. In one such type of camera the adjustment of the diaphragm setting member is effected by an electric motor which is reversibly driven in response to selective energization of two relays, the latter being controlled by contacts which are actuated by a third, moving coil relay energized from the photoelectric element. By such arrangement the intensity of the light which strikes the photoelectric element controls indirectly the diaphragm of the camera, the latter being thereby adjusted to provide either smaller or larger apertures.

In another camera construction of the above type a power means in the form of an electromagnet is coordinated to each of two relays arranged to be selectively energized. The said electromagnet operates a pawl which is then arranged to shift the exposure setting member either forward or backward in small steps.

It has been found that the various camera structures employing automatic control devices of the above type have serious disadvantages. Such disadvantages involve especially the switching contacts of the moving coil relay which responds to the photocell current. These switching contacts are called on to carry an appreciable load current in spite of the use of additional relays controlled by such contacts, whereby pitting, deterioration and sticking take place and the contacts progressively melt and eventually become so blackened and burnt away as to be no longer operative. Such condition is especially found in connection with moving coil relays which are required to have great sensitivity while at the same time occupying but little space. Relays of this type usually have a small deflection or path of movement with but little power in the moving coil system, and the contacts which are actuated are necessarily small and capable of only light duty. The deterioration and burning down of the movable contact of such a moving coil relay results in the gap or clearance between such contact and the stationary contacts becoming appreciably larger. Also, the spacing between the stationary contacts increases, with the net result that under certain circumstances the accuracy of adjustment of the speed setting member is appreciably adversely affected. Also, the melting of the contacts caused by the excessive current, especially at the time that the circuit is closed, results in sticking of the movable contact to the engaged stationary contact. As a conseqence, immediate separation of these contacts does not occur when the reverse force is first applied, but instead separation occurs at a later time, after the controlled power means has operated beyond the required and desired time. In other words, the slight sticking of the contacts requires increased torque in the moving coil of the relay to effect separation, and such increased torque is not obtained until after the power means or control device has overrun the necessary or proper distance.

Because of the above action due to the sticking of the relay contacts the aperture of the diaphragm may be set to an incorrect value, either too large or else too small, considering the actual existing light conditions which the photocell is subjected to. Also, such sticking will result in the power means or control device being sluggish in its response and having insufficient sensitivity to accurately reflect changes in the conditions of illumination. Also, such circumstances may result in a permanent hunting or oscillation of the power means or control device. An object of the present invention is to provide an improved photographic camera with automatic exposure setting of the general type referred to, which obviates the above disadvantages and provides instead an extremely reliable operation together with increased sensitivity and accuracy in adjusting the exposure setting member of the camera, all independent of the frequency of the switching operation and movement of the contacts thereof.

This is accomplished, in accordance with the invention, by the provision of a novel and improved power supply for the driving motor which actuates the exposure setting member of the camera, said power supply comprising a pair of electronic amplifiers, preferably employing transistors, which are coordinated to the forward and reverse turning movement of the motor. The said electronic amplifiers may be alternately energized or switched on by the movable contact of a moving coil relay as the said contact cooperates with two stationary contacts which are connected with the input-circuits of the amplifiers.

By such organization, as provided by the invention, wherein electronic amplifiers are employed to control the direct current motor, such amplifiers being in turn controlled by the moving coil relay, only a very small load current need be carried by the switch contacts of the moving coil relay, and the magnitude of the current is such that even with the most frequent closing and opening of the control circuit for the amplifiers there is no appreciable melting or burning of the contacts and accordingly no change in the clearance or gap between the movable contact and the two cooperable stationary contacts. As a consequence, the camera as provided by the present invention is characterized by great reliability of operation and sensitive response of the exposure setting member to all existing light conditions, together with a high degree of accuracy in the control.

In the accompanying drawing and in the following description the invention is exemplified by a camera structure having an intra-lens shutter. The above mentioned advantages and further features and advantages of the invention will be more fully brought out in connection with the said drawings and description.

FIGURE 1 is a front elevational view in schematic form of a photographic camera with intra-lens shutter executed in accordance with the invention. The speed and diaphragm setting members arranged at the shutter, together with other working parts, are illustrated in detail only as far as required for an understanding of the invention.

FIG. 2 is a top plan view in schematic representation of the photographic camera shown in FIG. 1.

FIG. 3 is a schematic diagram of the automatic exposure setting device of the camera as provided by the invention, the settable member which is automatically adjusted being that which controls the diaphragm aperture.

Referring to FIGS. 1 and 2, the front of the casing of the camera is indicated by the numeral 1, said front casing part carrying an intra-lens shutter housing 2 in the well known manner. The driving mechanism for the shutter blades as well as the mechanism for obtaining different shutter speeds are disposed within the shutter housing 2 in a well known manner, and the specific arrangement is not shown herein in detail for reasons of clarity of illustration.

A speed setting ring 4 and a diaphragm setting ring 5 are carried by the shutter housing 2 and arranged to be concentric with the axis of the shutter, the diaphragm setting ring 5 being connected by means of a suitable gear 5b with a direct current motor 6 to be driven thereby for the purpose of adjustment of the diaphragm aperture in conformity with the light conditions existing at the subject to be photographed and in conformity with the chosen shutter speed and other exposure factors. Forward and reverse rotation of the motor 6 is effected by a power source under the control of a movable contact 7 actuated by the movable coil 8a of a moving coil relay 8. In FIGURE 3 the movable contact 7 is indicated as carried by an arm 7a extending to the right of the moving coil 8a.

Depending on the intensity of the prevailing illumination of the subject, the moving coil relay 8 is provided with greater or lesser deflecting currents from a photoelectric element 9 which is disposed behind a honeycomb window 40. The moving coil 8a (FIG. 3) of the relay 8 is thus deflected angularly in one direction or another, corresponding to the intensity of the current supplied by the photoelectric element 9. In consequence, the movable contact 7 of the relay 8, carried by the arm 7a, is brought into engagement with one or another of the oppositely disposed stationary contacts 10 and 11, depending on the value of the current supplied by the photocell 9. The movable contact 7 is so arranged as to have an intermediate position wherein it is disengaged from the stationary contacts 10 and 11 when a certain value of current flows through the coil 8a of the relay 8.

In accordance with the present invention power is supplied to the motor 6 from the outputs of two electronic amplifiers, which in the illustrated embodiment of the invention are constituted as transistor amplifiers 12, 13. These two electronic amplifiers are coordinated to the forward and reverse driving movements of the motor 6, and are arranged so that they may be alternately energized or switched on by means of the movable contact 7 of the moving coil relay 8. For this purpose, the stationary contacts 10, 11 which cooperate with the movable contact 7 are suitably connected to the input circuits of the amplifiers 12, 13 as shown.

By the above arrangement of electronic amplifiers there is obtained the important advantage that the direct current motor can be energized for both forward and reverse driving movements under the control of the contacts 7, 10 and 11 of the moving coil relay 8 without such contacts carrying an appreciable load current sufficient to cause their deterioration, and in consequence there is insured a reliable operation of the control device and a high accuracy and sensitivity of the entire control mechanism.

In carrying out the invention, in accordance with the showing of FIGURE 3, a logarithmically graduated variable resistor 14 is connected in parallel with the moving coil relay 8. The said resistor 14 can be changed in dependence of the adjusting movements of the diaphragm setting ring 5, and its inclusion in the circuit of the moving coil relay 8 results in the setting ring being automatically placed in a specific adjustment or position as determined by the intensity of light which strikes the photocell 9, as will be described in detail below.

By the provision of the variable resistor 14 arranged to be responsive to movements of the diaphragm setting ring 5 there is obtained the special advantage that the moving coil relay 8 may be placed at the most advantageous location within the camera, which location may now be selected at will. In particular, there is no necessity of a mechanical connection being provided between the moving coil relay 8 and the diaphragm or speed setting members of the camera.

Instead of connecting the variable resistor 14 in parallel with the moving coil relay 8, it may be connected in series in the circuit of the coil 8a of the relay to provide the same end results.

As clearly shown in FIGS. 1 and 3, the winding or resistance element of the variable resistor 14 is mechanically connected with the speed setting ring 4 of the camera so as to be shifted in response to movement of said ring, whereas the sliding contact 15 of the variable resistor is affixed to the diaphragm setting ring 5 to move simultaneously therewith. By this organization it is possible to make use, in an advantageous manner, of the adjusting movements of the speed setting ring 4, which ring is not automatically driven by the motor 6, and thus the setting of the speed setting ring is taken into account with the automatic adjustment of the diaphragm setting ring by the motor. Such organization, therefore, insures a proper coordination between the correct diaphragm value corresponding to the prevailing light conditions and the preselected time as determined by the setting of the speed setting ring 4.

Also, in accordance with the invention, the connection of the variable resistor 14 with the speed setting ring 4 of the camera may include a releasable coupling which permits relative adjustment of the speed setting ring and resistor element. By this arrangement it is possible in a simple and advantageous manner to take into account further exposure factors, as for example filter data, film speed and the like. Instead of effecting relative adjustment of the resistor element with respect to the speed setting ring 4, it is possible to provide a releasable coupling between the sliding contact 15 of the variable resistor 14 and the diaphragm setting ring 5, to enable relative adjustment to be made between these last-mentioned parts.

In order to enable the adjustments above mentioned, as between the resistant element and the speed setting ring or the movable contact 15 and the diaphragm setting ring to function properly in the automatic control mechanism it is necessary to arrange the length of the resistor element so that it remains in engagement with the contact 15 of the variable resistor 14 even for the extreme angular or end positions in which both may be placed with respect to each other.

Another method for taking into account additional exposure factors is also illustrated in the embodiment of the invention of FIG. 3. In accordance with the invention, the fixed contacts 10 and 11 which cooperate with the movable contact 7 of the moving coil relay 8 are mounted on a carrier 18 which is movable along a fixed guide 16, the carrier being suitably connected with a dial having a scale 17.

This latter arrangement is of special advantage where there is not sufficient space available to extend the resistor element of the variable resistor 14 the required amount to maintain engagement with the sliding contact 15, or in cases where manufacturing difficulties would be encountered in providing a widely graduated logarithmic resistance. Also, it might be desirable from an operating standpoint to provide the adjustment for film sensitivity at a point which is removed from the location at which the speed and diaphragm setting rings are mounted.

In some cases it is of further advantage to take into account additional exposure factors by arranging for relative adjustment of the resistive element and/or the sliding contact 15 of the resistor 14 with respect to the speed and diaphragm setting rings, in addition to the adjustable mounting of the fixed contacts 10 and 11. By this organization there is, for example, the advantage that the adjustment of the contact carrier 18 may be made to take into account the film sensitivity, which would then not be changed during the exposure of the entire film while at the same time prolongation or filtering factors which are to be adjusted to individual exposure or picture-taking conditions and are therefore likely to be changed from exposure to exposure may be taken into account by relative shifting of the resistor element or its sliding contact 15 with respect to the speed and diaphragm setting rings.

In order to increase the current which is produced by the photoelement 9, in accordance with the present invention, an electronic amplifier 19, preferably a one stage transistor amplifier can be included in the circuit between the moving coil relay 8 and the photoelement 9. An advantage resulting in the use of such amplifier 19 is that the moving coil relay may be of a type having a lesser sensitivity, which may be more readily and economically manufactured than the higher sensitivity type required where no intermediate amplifier is utilized. Also, by the inclusion of the amplifier 19, which may be of a well known construction, a photoelement 9 having a small light-sensitive surface may be used, thereby resulting in a saving of space at the camera housing and a more favorable disposition of the photoelement.

Between the photoelement 9 and the moving coil relay 8 a standard resistor 41 and a temperature-responsive resistor 20 are connected, for the purpose of minimizing fluctuations in the current which energizes the coil 8a of the moving coil relay 8 due to temperature changes. The manner of operation of the said resistors in maintaining a constant current value is well known, so that it is unnecessary to describe it here in detail.

As clearly seen in FIG. 3, the output circuits of both the amplifiers 12, 13 are connected to each other in a bridge arrangement. The amplifiers 12, 13 are shown as being of the PNP transistor type, with the output circuits being constituted by the emitter and collector elements, and with the input circuits being constituted by the emitter and base elements. It may be further observed from FIG. 3 that the motor 6 is connected to the bridge output circuit in a diagonal branch thereof, and that the direction of the current flowing through the motor can be reversed by alternating the operation of the amplifiers 12, 13. The bridge arrangement of the output circuits of the transistors represents an especially favorable switching arrangement, by which there is effected a saving of control components and materials, which is of importance in small devices such as cameras and the like.

Energization of the transistor amplifiers 12, 13 is effected by batteries 21 and 22 having the indicated polarities, said batteries being of relatively low voltage as required by the characteristics of the transistors. The batteries 21 and 22 may be arranged in series with the emitters of the transistors 12, 13, which emitters in conjunction with the collectors of the transistors form a closed loop as may be readily observed from an inspection of FIG. 3.

Also, in accordance with the present invention, the direct current motor 6 which drives the diaphragm ring 5 is constituted as a miniature-type high-speed motor. The motor 6 is connected with the diaphragm setting ring 5 through a reduction gearing 23 as indicated. By virtue of such reduction gearing there is obtained an appreciable mechanical advantage, with increased torque such that even a multiple blade diaphragm having considerable friction may be readily actuated without difficulty.

The combination of a miniature high speed motor with reduction gearing as provided by the invention results in an important advantage in that the automatic exposure setting device, particularly the components involved in the drive for the respective exposure setting member, may be located within the camera in a compact arrangement which requires only little space.

Another special advantage is the fact that a motor of such small size and high speed, together with its reduction gearing, can be arranged in the interior 3 of the intra-lens shutter housing 2. This is clearly shown in FIGURE 1, where the motor 6 and gearing 23 are indicated as connected with the diaphragm setting ring 5 to drive the latter. For this purpose, the diaphragm ring 5 is provided with a toothed segment 5b as shown. The construction of the driving assemblage comprising the motor 6 and reduction gearing 23 may be such that no larger space is required to incorporate it in the shutter housing than the space ordinarily provided for a well-known delayed-action device or slow speed assembly.

The above organization for driving the diaphragm setting ring 5 represents the most effective and efficient driving means for said ring, inasmuch as additional transmission parts for connecting widely spaced components, such as might be used to connect a remotely located gear assemblage to the exposure setting member, are unnecessary. Also, it is advantageous from the standpoint of quick and accurate assembly of the camera to arrange the mechanical driving means for the exposure setting member within the housing 2 of the intra-lens shutter.

By virtue of the provision of a miniature type high speed motor of small size and reduction gearing it is further possible to locate the motor and gearing in the interior of a lens assembly. Thus, such a power and drive means may even be incorporated in cameras which have the diaphragm built into the lens, that is, cameras with focal plane shutters or interchangeable lens assemblies, and these cameras could then have the benefit of an enclosed drive constituting a portion of an automatic setting control. It is readily understood that such enclosed drive may be more reliable in its functioning because of the protection afforded it.

FIGURES 1 and 2 show an organization of automatic exposure setting device as provided by the invention, which is of special advantage as regards the utilization of space, and space requirements. In these figures the moving coil relay 8 together with the photoelement 9 and also the transistor amplifiers 12, 13 are disposed within the housing 1 of the camera, being constituted as separate or individual units. The connections between said units may then constitute merely connecting wires, so that the units may be arranged in the most desirable locations without regard to their interconnections. Thus, available space within the camera housing, which has not yet been utilized for other purposes, may be readily used for the above separate units.

In the illustrated embodiment of the invention the photo-element 9 and the moving coil relay 8 may constitute a complete unit and may be located in a space provided in the upper portion of the camera housing 1, which space with well known cameras is set aside for the location of a built-in exposure meter. Thus, by the above organization the provision of the miniature high speed motor 6 and reduction gearing 23 and the provision of the photo-element 9 with the moving coil relay 8 will not require more space than is already occupied in well known cameras by other functional assemblies. Also, since the connection with the transistor amplifier unit, indicated by the numeral 27 in FIGS. 1 and 2, is an electrical connection only, this unit may be readily placed within the camera housing 1 and preferably in the space that is left free inside the cover in well-known cameras. As an alternative, in order to fully utilize available space in the camera, the transistor amplifiers 12, 13 may be arranged separately instead of in a single unit, and the same is true of the batteries 21 and 22 for the amplifiers.

In the illustrated embodiment of the invention the setting for film speed or sensitivity is performed by means of the adjustable shifting of the fixed contacts 10, 11 and carrier 18 therefor. For this purpose, the upper wall of the camera housing 1 is provided with a disk 24 having a film speed scale 17, said disk being shiftable by means of a manually engageable knob 25. The scale 17 is cooperable with a fixed setting or index mark 26 on the camera housing. By means not shown herein, the disk 24 is mechanically connected to the carrier 18 on which the fixed contacts 10, 11 are mounted, see FIG. 3. Thus, as the disk 24 is turned, the fixed contacts 10, 11 will be simultaneously shifted and adjusted.

As already mentioned above, the connections between the individual units of the control mechanism for effecting an automatic exposure setting of the camera is made solely by wires. In FIG. 2, wires 28 and 29 are shown as connecting the moving coil relay 8 with the electronic amplifiers 12, 13. The driving motor 6 is connected, by means of wires 30 and 31, with the amplifier unit 27 comprising the amplifiers 12, 13. The wire connection between the resistor 14 and the photoelement 9 is diagrammatically illustrated at 42.

In further advantageously carrying out the invention, the motor 6 is connected with the exposure setting member through a releasable coupling 32. This provides the advantage that where the automatic exposure setting device is not to be utilized, as for example, where flashlight exposures are to be made, an exposure setting of the camera may be readily performed in the usual well-known manner.

In the illustrated embodiment of the invention the releasable coupling 32 is constituted as a slip-type friction coupling, which is disposed between the reduction gearing 23 and the diaphragm setting ring 5. By the provision of such friction coupling there is attained a desirable simplicity as regards operation of the camera, as well as an appreciable saving of space and maximum reliability in the functioning of the device. For one thing, it is not necessary to provide a special manually operable actuating member for the coupling when the latter is constituted as a frictional, slip type coupling. Further, such a frictional coupling requires but little space, and the relatively movable parts of the coupling will effect the required drive for any given relative positions.

Also, by disposing the friction coupling 32 between the reduction gearing 23 and the diaphragm setting ring 5 the latter will be easily adjustable by hand when this should be desired, without the motor 6 being energized. This is because for such shifting it is only necessary to move the diaphragm setting ring and not any of the components of the reduction gearing. Such feature is of the utmost importance in enabling a quick setting of the camera to be had, especially when it is desired to make flash light exposures wherein different distances of the subject from the camera are accounted for mainly by adjustment solely of the diaphragm setting ring 5.

In order to prevent unnecessary drain from the batteries 21 and 22 the battery circuits may be interrupted by the switches 33 and 34 at such times that the control device is not being used. The actuation of the switches 33 and 34 may be optionally effected by hand or by manipulation required in bringing the camera into a condition wherein it is ready to use. The switches may be connected for concurrent actuation, as indicated by the broken connection line. At the moment that the switches 33, 34 are closed the electronic amplifiers will be immediately ready for operation and in fact the entire speed setting device will be ready, since the transistors do not have to be heated, and therefore no waiting time is required until they are ready for operation.

The manner of operation of the automatic exposure setting device as provided by the invention is as follows:

At first those exposure factors other than the shutter speed and diaphragm, as for example, film speed or sensitivity and filter factors, should be adjusted. This is accomplished, in the illustrated embodiment of the invention, by setting the disk 24 with respect to the index mark 26 whereby the fixed contacts 10, 11 will be adjusted to a certain position with respect to the fixed guide 16.

As determined by the intensity of the light which strikes the photoelement 9, the movable contact 7 carried by the arm 7a of the moving coil 8a of the relay will be disposed in one of three possible positions.

It will either come to rest against the fixed contact 10, or else against the fixed contact 11 or else it will be disengaged from both the said fixed contacts. If the contact 7 is engaged with one of the fixed contacts 10 or 11, and if the switches 33 and 34 are closed one of the electronic amplifiers will be rendered operative, and a current will flow in the output circuit of the said amplifier. The operative amplifier will be associated with that one of the fixed contacts which is engaged by the movable contact 7, as will be understood. For such operative condition of the amplifier a basic current will flow in the transistor, through one of the resistors 43 or 44 depending on which transistor is made operative. This current will effect a commutator current in the said operative transistor, which will energize the motor 6. Depending on whether the transistor 12 or 13 is made operative, the motor 6 will be caused to move either forward or backward, as may be readily understood from the circuit shown in FIG. 3. By virtue of the reduction gearing 23 and frictional clutch 32 the motor 6 will now drive the diaphragm setting ring 5 and with it the sliding contact 15 which cooperates with the resistor element of the variable resistor 14. By virtue of the circuit connections between the photoelement 9 and the moving coil relay 8 as already described above and shown in FIG. 3, the varying of the resistor 14 provides a shunt circuit of greater or lesser resistance across the relay 8, and thus either weakens or increases the current flowing through this relay. The energization of the motor 6 and the turning of the diaphragm setting ring 5 will continue until the variation of the resistor 14 causes a current value to flow through the relay 8 in a manner to separate the movable contact 7 from the stationary contact which it has been engaging. The movable contact 7, when it is free of the stationary contacts 10 and 11, will render both of the electronic amplifiers 12 and 13 inoperative, and accordingly current will no longer be supplied to the driving motor 6, whereby the latter will come to a halt, together with the diaphragm setting ring 5.

The rendering of the transistor amplifier inoperative and the termination of movement of the motor 6 indicates that the diaphragm setting ring 5 is now in a properly adjusted position, with the diaphragm aperture corresponding to the prevailing light conditions, and this automatic adjustment has taken into consideration the preset values of shutter speed as determined by the position of the speed setting ring 4, film speed or sensitivity, and filter factors.

If the diaphragm setting ring 5 should reach one of its end stop positions, as for example either of the positions corresponding to diaphragm values of 2.8 or 22, without the motor 6 being de-energized and halted, the speed setting ring 4 must be re-adjusted in one direction or the other for either a faster or slower shutter speed as determined by the diaphragm value which has been set by the diaphragm setting ring 5.

In such circumstance there is a further advantage ensuing from the provision of the frictional coupling 32 between the reduction gearing 23 and the speed setting ring 5. Due to such frictional coupling, the motor 6 may continue to run even when the setting ring 5 is halted, without causing damage to the components involved. This continued operation of the motor 6 may at the same time constitute an indicating or admonishing signal for the photographer, indicating that he has not yet obtained the proper speed-diaphrgam setting.

In addition to the above signal, depending on which of the two stop positions has been reached by the diaphragm setting ring 5, further well known indicating or locking means may be actuated. For example, a color signal may be provided in the view finder, as by the provision of a fixed contact 60 cooperable with the slider contact 15 of the variable resistor 14, said fixed contact being connected with a battery 61 arranged to energize an electro-magnet 62 which in turn may operate a colored vane 63 provided in the view finder of the camera.

Also, a locking means may be made operative, to prevent operation of the shutter release of the camera. Such locking means may comprise a two-armed lever 65, arranged to be actuated by the sliding contact 15 of the variable resistor 14, said lever constituting an obstruction for the release button 66 of the camera shutter. This would draw the operator's attention to the fact that the proper speed-diaphragm setting has not yet been reached, thus enabling him to change the pre-selected speed for effecting a proper camera setting before taking the exposure.

In order to prevent the motor 6 from running for too long a period and thereby draining current from the batteries 21 and 22 of the electronic amplifiers, an automatic switching means may be arranged, to be actuated in response to the diaphragm setting ring 5 reaching one of its end stop positions. For example, the switches 33 and 34 which are coupled together for simultaneous operation may be further coupled with the colored vane 63 so as to be actuated in response to energization of the electromagnet 62. Therefore, not only will a visual signal be given but also at the same time the electronic amplifiers will be automatically rendered inoperative and the motor 6 will be de-energized, thereby saving the batteries 21 and 22.

In the illustrated embodiment of the invention the camera is shown as being of the intra-lens shutter type, and the diaphragm setting ring is the setting member which is automatically set by the described control mechanism. The present invention, however, has utility in connection with cameras of any type, and may effect an automatic setting of any occurring exposure factors, as diaphragm, speed or exposure values. As already mentioned above, in connection with the automatic setting of the diaphragm in a camera having a focal plane shutter or a camera having an interchangeable lens assembly, the motor and reduction gearing can be arranged within the lens unit itself, and the connection of the motor with the output circuits of the amplifiers may be effected in an advantageous manner by means of plug-in connections between the lens assembly and the camera housing.

It is essential, as provided by the present invention, that regardless of the camera in which the control mechanism is incorporated the contacts of the moving coil relay which serve the purpose of switching the forward and reverse movements of the motor 6 are subjected to only very small currents which will not damage or pit the contacts and cause deterioration even at the highest frequency of switching. This is accomplished by the provision of the electronic amplifiers (12 and 13), and such amplifiers may employ electronic tubes or transistors, as both such amplifiers may be controlled or switched on or off using currents of very low value. It is of particular advantage to use transistor amplifiers, preferably switching-type transistors, since by virtue of their small size they need but little space and do not require a heating time. In addition to this, they are more rugged in their construction, and are not subject to failure due to mechanical shock or stress.

In addition to the important advantage that the electronic amplifiers prevent deterioration of the switching contacts of the moving coil relay 8 there is the further advantage that mechanically driven devices such as additional relays are not needed between the moving coil relay 8 and the driving motor 6.

It will now be understood from the foregoing that the present invention provides an improved device for obtaining automatic exposure settings in a camera, which device is distinguished in every respect by the greatest possible reliability of operation and working accuracy, and which device by virtue of its compact construction and small size may be incorporated in cameras of any type and construction.

I claim:

1. An automatically settable photographic camera comprising
    (a) exposure setting ring,
    (b) a direct current reversible motor mechanically connected to reversibly drive said ring,
    (c) a pair of alternately operable electronic amplifiers,
    (d) each of said amplifiers including a control circuit, an output circuit and a D.C. electrical power supply connected in said output circuit,
    (e) said amplifiers being connected to said motor so as to apply driving currents thereto in opposition whereby said power supplies are adapted to drive said motor in reverse directions when rendered operative one at a time,
    (f) means for effecting alternate actuation of said amplifiers to effect driving of said motor either forward or backward,
    (g) said latter means including a moving coil relay having a moving coil controlling a movable contact,
    (h) a pair of contacts cooperatively associated with said movable contact, one of said pair of contacts being connected in each of said control circuits of the respective amplifiers whereby engagement of the movable contact with one or the other of the said pair of contacts renders operative the associated control circuit and effects operation of one amplifier or the other to drive the motor forward or backward,
    (i) and a photoelement connected with said moving coil relay to energize the latter, the circuit of said photoelement and moving coil being independent of the motor circuit for effecting the setting of the ring.

2. The invention as defined in claim 1 in which there is a variable resistor connected with the moving coil relay to alter the current therethrough, and means for varying said resistor in response to movement of the exposure setting ring.

3. The invention as defined in claim 2 in which there is a speed setting ring and a diaphragm setting ring, and in which the variable resistor comprises a resistance element and a contactor movable thereover, said element and contactor being connected individually to the said two setting rings.

4. The invention as defined in claim 3 in which there is a releasable coupling between the variable resistor and the speed setting ring to enable relative movement therebetween for considering other exposure factors.

5. The invention as defined in claim 2 in which there is a releasable coupling between the variable resistor and the exposure setting ring to enable relative movement therebetween for considering other exposure factors.

6. The invention as defined in claim 2 in which there is an adjustable mounting for the fixed contacts of the relay to enable them to be adjustably shifted for taking into account other exposure factors, and in which there are scale means associated with said adjustable mounting to provide indications of such factors.

7. The invention as defined in claim 1 in which there is an electronic amplifier connected between the photoelement and moving coil relay to increase the power brought to the latter.

8. The invention as defined in claim 1 in which the input circuits of the amplifiers are connected in a bridge circuit, and in which the motor is connected in the diagonal of a bridge which includes the output circuits of the amplifiers, whereby the motor current is reversed by rendering one amplifier inoperative and the other operative.

9. The invention as defined in claim 1 in which the motor is of the miniature, high-speed type, and in which there is reduction gearing between the motor and diaphragm setting ring.

10. The invention as defined in claim 9 in which there is an intra-lens shutter housing on the camera, and in which the motor and reduction gearing are disposed within the said shutter housing.

11. The invention as defined in claim 10 in which the moving coil relay, photoelement and electronic amplifiers are disposed within the housing of the camera.

12. The invention as defined in claim 9 in which there is a friction slip-type coupling located in the driving connection between the reduction gearing and the exposure setting ring.

13. The invention as defined in claim 1 in which there is a releasable coupling in the driving connection between the motor and the exposure setting ring, which may be rendered inoperative by continued turning of the motor.

14. The invention as defined in claim 13 in which the releasable coupling comprises a friction, slip-type coupling.

15. The invention as defined in claim 1 in which there is a visual warning means actuated in response to the exposure setting ring reaching an end stop-position.

16. The invention as defined in claim 1 in which there are means for opening the energizing circuits of the amplifiers in response to the exposure setting ring reaching an end stop-position.

17. An automatically settable photographic camera comprising
 (a) exposure setting ring,
 (b) a direct current reversible motor mechanically connected to said ring for reversibly driving said ring,
 (c) a pair of electronic amplifiers,
 (d) each of said amplifiers including a control circuit, an output circuit and an electrical power supply connected in said output circuit,
 (e) the output circuits of each of said amplifiers being connected in a bridge arrangement,
 (f) said motor being connected to said bridge arrangement in a diagonal branch thereof to apply driving currents thereto in opposition whereby said power supplies are adapted to drive said motor in reverse directions when said amplifiers are rendered operative one at a time,
 (g) a moving coil relay having a moving coil controlling a movable contact,
 (h) a pair of contacts cooperatively associated with said movable contact electrically connected in said control circuits of the amplifier whereby engagement of the movable contact with one or the other of the said pair of contacts renders operative the associated control circuit and effects operation of one amplifier or the other to drive the motor forward or backward,
 (i) and a photoelement connected with said moving coil relay to energize the latter, the circuit of said photoelement and moving coil being independent of the motor circuit for effecting the setting of the ring.

References Cited in the file of this patent
UNITED STATES PATENTS

| | | |
|---|---|---|
| 2,059,032 | Riszdorfer | Oct. 27, 1936 |
| 2,388,609 | Ericsson | Nov. 6, 1945 |
| 2,683,402 | Bruck | July 13, 1954 |
| 2,780,971 | Fahlenberg | Feb. 12, 1957 |
| 2,841,064 | Bagby et al. | July 1, 1958 |
| 2,874,622 | Gebele | Feb. 24, 1959 |
| 2,913,969 | Faulhaber | Nov. 24, 1959 |
| 2,956,492 | Quick | Oct. 18, 1960 |
| 2,999,439 | Nerwin et al. | Sept. 12, 1961 |

FOREIGN PATENTS

| | | |
|---|---|---|
| 491,410 | Great Britain | Sept. 1, 1938 |
| 787,720 | Great Britain | Dec. 11, 1957 |